United States Patent
Kuo et al.

(10) Patent No.: US 7,275,514 B2
(45) Date of Patent: Oct. 2, 2007

(54) METHOD OF HCCI AND SI COMBUSTION CONTROL FOR A DIRECT INJECTION INTERNAL COMBUSTION ENGINE

(75) Inventors: Tang-Wei Kuo, Troy, MI (US); Zongxuan Sun, Troy, MI (US); James A. Eng, Troy, MI (US); Barry L. Brown, Lake Orion, MI (US); Paul M. Najt, Bloomfield Hills, MI (US); Jun-Mo Kang, Ann Arbor, MI (US); Chen-Fang Chang, Troy, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 21 days.

(21) Appl. No.: 11/386,203

(22) Filed: Mar. 22, 2006

(65) Prior Publication Data

US 2006/0243241 A1     Nov. 2, 2006

Related U.S. Application Data

(60) Provisional application No. 60/675,585, filed on Apr. 28, 2005.

(51) Int. Cl.
*F02B 5/00*    (2006.01)
*F01L 1/34*    (2006.01)
*F02M 25/07*   (2006.01)

(52) U.S. Cl. ............... 123/299; 123/90.15; 123/406.41; 123/435; 123/486; 123/568.14; 123/609

(58) Field of Classification Search ............. 123/90.11, 123/90.15, 27 R, 294, 295, 299, 305, 406.22, 123/406.41–406.43, 435, 478, 486, 568.14, 123/568.21, 609

See application file for complete search history.

(56) References Cited

U.S. PATENT DOCUMENTS

| | | | |
|---|---|---|---|
| 6,082,342 A | 7/2000 | Duret et al. | 123/568.14 |
| 6,386,177 B2 | 5/2002 | Urushihara et al. | 123/299 |
| 6,971,365 B1 | 12/2005 | Najt et al. | 123/305 |
| 6,994,072 B2 | 2/2006 | Kuo et al. | 123/295 |
| 7,121,254 B2 * | 10/2006 | Wickman et al. | 123/304 |
| 2006/0005788 A1 | 1/2006 | Kuo et al. | 123/21 |
| 2006/0005806 A1 | 1/2006 | Kuo et al. | 123/299 |
| 2006/0016423 A1 | 1/2006 | Kuo et al. | 123/299 |

FOREIGN PATENT DOCUMENTS

| | | |
|---|---|---|
| WO | WO0146571 | 6/2001 |
| WO | WO0146572 | 6/2001 |
| WO | WO0146573 | 6/2001 |

* cited by examiner

*Primary Examiner*—T. M. Argenbright

(57) ABSTRACT

The present invention relates to methods for robust controlled auto-ignition and spark ignited combustion controls in gasoline direct-injection engines, including transients, using either exhaust re-breathing or a combination of exhaust re-compression and re-breathing valve strategy. These methods are capable of enabling engine operation with either lean of stoichiometric or stoichiometric air/fuel ratio for oxides of nitrogen (NOx) control, with varying exhaust gas recirculation (EGR) rates and throttle valve positions for knock control, and with a combination of homogeneous charge compression ignition (HCCI) and spark ignition (SI) combustion modes to optimize fuel economy over a wide range of engine operating conditions.

21 Claims, 6 Drawing Sheets

METHOD OF HCCI AND SI COMBUSTION CONTROL FOR A DIRECT INJECTION INTERNAL COMBUSTION ENGINE

CROSS REFERENCE TO RELATED APPLICATION

This application claims the benefit of U.S. Provisional Application No. 60/675,585, filed Apr. 28, 2005, which is hereby incorporated by reference in its entirety.

TECHNICAL FIELD

The present invention relates to a method for operating a four-stroke direct injection internal combustion engine capable of operating in both a spark ignited mode and a homogeneous charge compression ignited mode.

BACKGROUND OF THE INVENTION

Dilute combustion of gasoline in an internal combustion engine, using either air or recirculated exhaust gas (EGR), is known in the art to enhance the thermal efficiency and decrease the production of oxides of nitrogen (NOx). However, there is a limit to which an internal combustion engine may operate with a dilute mixture due to misfire and combustion instability resulting from a slow burn rate of the charge mixture. Known methods to extend the dilution tolerance limit include: 1) improving the ignitability of the mixture by enhancing ignition and mixture preparation, 2) increasing the flame speed by introducing charge motion and turbulence, and 3) operating the internal combustion engine in a controlled auto-ignition combustion mode.

The controlled auto-ignition process may be referred to as Homogeneous Charge Compression Ignition (HCCI). In this process, a charge mixture of EGR, air, and fuel is created and auto-ignition is initiated simultaneously from multiple ignition sites within the compressed charge mixture, thereby resulting in stable power output and high thermal efficiency. Since the combustion is highly dilute and uniformly distributed throughout the charge mixture, the temperature of the products of combustion is typically lower than that of a traditional spark ignited internal combustion engine with a propagating flame front and the diesel engine with an attached diffusion flame. The reduced temperature of the products of combustion may result in reduced NOx emissions when operating in the HCCI mode. Known methods to induce controlled auto-ignition at part load include: 1) heating the intake air, 2) varying the compression ratio, and 3) blending gasoline with fuels that have wider auto-ignition ranges than that of gasoline. In all the above methods, the range of engine speeds and loads in which controlled auto-ignition combustion can be achieved is relatively narrow.

A four-stroke direct injection internal combustion engine may operate in the HCCI mode by employing various valve opening and closing strategies. By altering the valve profiles, or operating characteristics of the exhaust valves and/or the intake valves, a high proportion of residual products of combustion may be retained within the cylinder of the internal combustion engine to provide favorable conditions to auto-ignite a highly dilute charge mixture. The range of engine speed and load over which controlled auto-ignition combustion can occur may be expanded by employing various valve operating strategies, thereby obviating the need to increase the compression ratio of the spark ignited (SI) internal combustion engine.

One such valve strategy is exhaust re-compression. With this strategy, the exhaust valve is closed earlier in the exhaust stroke than in a typical four-stroke internal combustion engine. Correspondingly, the intake valve is opened later than in a typical four-stroke internal combustion engine. The early exhaust valve closing and late intake valve opening provides a negative valve overlap period where products of combustion become trapped within the engine's cylinder. These trapped products of combustion will mix with and warm the fuel and air charge mixture during the intake stroke of the internal combustion engine, thereby promoting the auto-ignition process.

Another valve strategy is exhaust re-breathing. With this strategy, the exhaust valve is opened for a first period to allow combusted gasses to be expelled from the combustion chamber. Subsequently, the exhaust valve opens for a second period to allow products of combustion previously exhausted to be drawn back into the cylinder. By opening the exhaust valve twice during each cycle of the four-stroke internal combustion engine, favorable conditions are created within the combustion chamber to support stable auto-ignition combustion.

Yet another valve strategy is a hybrid between exhaust re-compression and exhaust re-breathing. In this mode, the exhaust re-compression mode may be used when the internal combustion engine is operating at a low engine load. For higher engine loads, the exhaust re-breathing strategy may be used. Additionally, by varying the exhaust valve lift and intake valve timing, the spark-ignited internal combustion engine may operate in a non-throttled load control mode (NTLC). In this mode, the intake valve timing will vary the engine load by controlling the amount of intake air communicated to the cylinder.

To enable the above-mentioned operating strategies, the internal combustion engine may be equipped with a variable valve actuation (VVA) system ranging from cam phasers and two-step valve actuation to a fully flexible valve actuation (FFVA) system.

SUMMARY OF THE INVENTION

The present invention relates to methods for robust controlled auto-ignition and spark ignited combustion controls in gasoline direct-injection engines, including transients, using either exhaust re-breathing or a combination of exhaust re-compression and re-breathing valve strategy. These methods are capable of enabling engine operation with either lean of stoichiometric or stoichiometric air-fuel ratio for oxides of nitrogen (NOx) control, with varying exhaust gas recirculation (EGR) and throttle valve positions for knock control, and with a combination of homogeneous charge compression ignition (HCCI) and spark ignition (SI) combustion modes to optimize fuel economy over a wide range of engine operating conditions.

A method of operating a four-stroke direct injection internal combustion engine having a combustion chamber, an intake valve having an intake valve profile defining a lift, timing, and duration, and an exhaust valve having an exhaust valve profile defining a lift, timing, and duration is provided. The method includes operating the internal combustion engine in a homogeneous charge compression ignition mode when engine load is at or below a first predetermined value. The method further includes operating the internal combustion engine in a spark ignited non-throttled load control mode when engine load is above the first predetermined value and below a second predetermined value. Additionally, the method includes operating the internal combustion engine in a spark ignited throttled mode when engine load is at or above the second predetermined value.

The method may further include operating the internal combustion engine with a generally lean of stoichiometric air/fuel ratio for a low engine load portion of the homogeneous charge compression ignition mode. Subsequently, the internal combustion engine may be operated with a generally stoichiometric air/fuel ratio for a high engine load portion of the homogeneous charge compression ignition mode. The method may also include injecting fuel into the combustion chamber at least twice during each cycle of the internal combustion engine when the internal combustion engine is operating in the low engine load portion of the homogeneous charge compression ignition mode.

The internal combustion engine may be operated in an exhaust re-compression mode and/or an exhaust re-breathing mode for at least a portion of the homogeneous charge compression ignition mode. Transitions between the various modes of operation are controlled by changes in the valve profile of the intake and/or the exhaust valve. Additionally spark may be provided within the combustion chamber for at least a portion of the homogeneous charge compression ignition mode.

A method of operating an internal combustion engine having a combustion chamber and controllable by an electronic control unit having a feed-forward control having a plurality of look up tables and a feed-back control is also provided. The method includes operating the internal combustion engine in a homogeneous charge compression ignition mode when engine load is at or below a first predetermined value, while the internal combustion engine is operated in a spark ignited non-throttled load control mode when engine load is above the first predetermined value and below a second predetermined value. The method further includes providing feed-forward command values, via the plurality of lookup tables, to the internal combustion engine for at least one of fuel injection pulse width, fuel injection timing, spark timing, spark dwell, and variable valve actuation control. The feed-back control operates to control at least one of the location of peak pressure within the combustion chamber, intake air oxygen percentage, and air/fuel ratio values using at least one of exhaust gas recirculation, variable valve actuation, throttle position, spark dwell, spark timing, fuel injection timing, and fuel injection pulse width values. The method also includes operating the internal combustion engine in a spark ignited throttled mode when engine load is at or above the second predetermined values. Feed-forward command values are provided, via the plurality of lookup tables, to the internal combustion engine for at least one of fuel injection pulse width, fuel injection timing, spark timing, spark dwell, variable valve actuation control, exhaust gas recirculation, and throttle position. The feed-back control operates to control the location of peak pressure within the combustion chamber using at least one of spark timing, spark dwell, injection timing, and fuel injection pulse width, and further controlling, via the feed-back control, the air/fuel ratio using at least one of throttle position, fuel injection pulse width, fuel injection timing, and exhaust gas recirculation values.

The method may further include operating the internal combustion engine with a lean of stoichiometric air/fuel ratio for a low engine load portion of the homogeneous charge compression ignition mode. Feed-forward command values are provided, via the plurality of lookup tables, to the internal combustion engine for at least one of fuel injection pulse width, fuel injection timing, spark timing, spark dwell, and variable valve actuation. The feed-back control operates to control the location of peak pressure within the combustion chamber using variable valve actuation values and controlling, via feed-back control, the air/fuel ratio using at least one of variable valve actuation and throttle position values. Subsequently, the internal combustion engine may be operated with a stoichiometric air/fuel ratio for a high engine load portion of the homogeneous charge compression ignition mode. Feed-forward command values are provided, via the plurality of lookup tables, to the internal combustion engine for at least one of fuel injection pulse width, fuel injection timing, spark timing, spark dwell, variable valve actuation control, exhaust gas recirculation, and throttle position. The feed-back control operates to control at least one of the location of peak pressure within the combustion chamber, intake air oxygen percentage, and air/fuel ratio values using at least one of exhaust gas recirculation, variable valve actuation, throttle position, spark dwell, spark timing, fuel injection timing, and fuel injection pulse width values.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The following description addresses the present invention with application to a single cylinder direct-injection gasoline four-stroke internal combustion engine. Those skilled in the art will appreciate that the present invention is equally applicable to a multi-cylinder direct-injection gasoline four-stroke internal combustion engine, such as those having four, six, or eight cylinders. Additionally, the following description addresses the present invention in its application to a two valve per cylinder engine (one intake and one exhaust valve). It should also be appreciated that the present invention is equally applicable to an internal combustion engine with multiple intake or exhaust valves per cylinder. Alternative fueling strategies, such as port fuel injection and throttle body fuel injection may also be used in conjunction with certain aspects of the present invention; however, the preferred approach is direct injection. Additionally, while widely available grades of gasoline and light ethanol blends thereof are preferred fuels, alternative liquid and gaseous fuels such as higher ethanol blends (E80, E85, etc.), neat ethanol (E99), neat methanol (M100), natural gas, hydrogen, biogas, various reformates, syngases, etc. may also be used in the implementation of the present invention.

Those skilled in the art will recognize that the term "four-stroke" generally designates an internal combustion engine whose crankshaft rotates through two revolutions or 720 degrees during each engine cycle. That is, a piston within the internal combustion engine will move from a top dead center (TDC) position to a bottom dead center (BDC) position during what is termed the intake stoke wherein intake air and/or fuel is introduced to the internal combustion engine. During the compression stroke, the piston will then move from the BDC position to the TDC position where the fuel and air mixture is compressed to provide favorable conditions for combustion. Subsequently, the piston will move from the TDC position to the BDC position during the power or expansion stroke. It is during the expansion stroke that rapidly expanding combustion gases urge the piston downward to create power. Products of combustion or exhaust gases are forced from the internal combustion engine as the piston moves from the BDC position to the TDC position in what is commonly referred to as the exhaust stroke. In contrast to a two-stroke internal combustion engine, the flow of intake air into the four-stroke internal combustion engine and the flow of exhaust gas from the four-stroke internal combustion engine are traditionally controlled via poppet valves.

Figure 1:
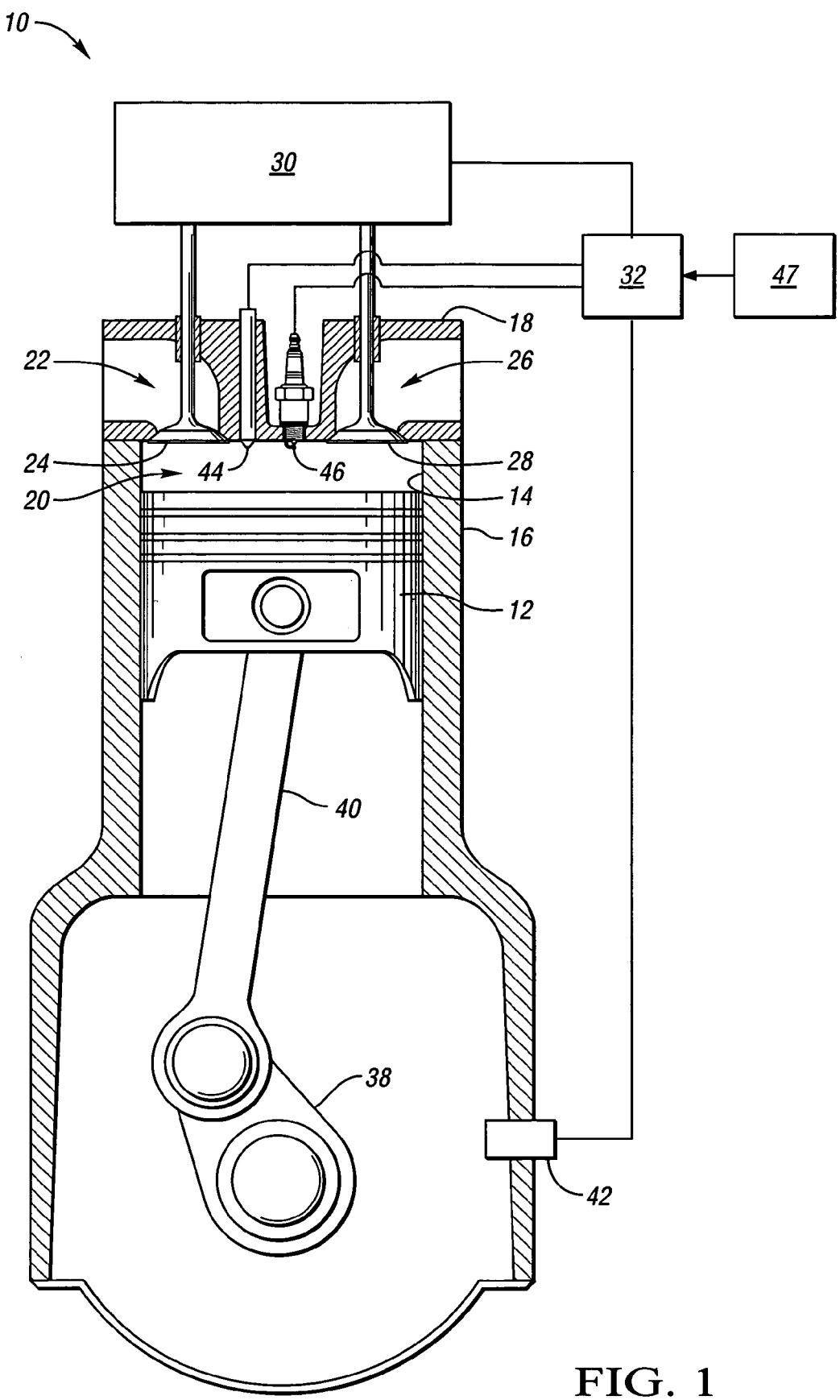
FIG. 1 is a schematic illustration of a single cylinder, gasoline fueled, direct-injection four-stroke internal combustion engine configured to operate with the methods of the present invention.

Referring to FIG. 1, there is shown a schematic illustration of a single cylinder direct-injection four-stoke internal combustion engine 10. The internal combustion engine 10 is operable in a homogeneous charge compression ignited, or HCCI, mode of operation and a spark ignited, or SI, mode of operation. The internal combustion engine 10 has a piston 12 reciprocally movable within a cylinder bore 14 defined by a cylinder liner 16. The piston 12, cylinder bore 14, and a cylinder head 18 cooperate to form a variable volume combustion chamber 20. An intake port 22, defined by the cylinder head 18, is operable to communicate intake air from an intake manifold, not shown, to the combustion chamber 20. The flow of intake air into the combustion chamber 20 is selectively controlled by the opening and closing of an intake valve 24. Additionally, those skilled in the art will recognize that an amount of recirculated exhaust gas, or EGR gas, may be selectively provided to the combustion chamber 20 in addition to the intake air. The products of combustion or exhaust gas will flow from the combustion chamber 20 into an exhaust port 26 defined by the cylinder head 18. The flow of the exhaust gas is selectively controlled by the opening and closing of an exhaust valve 28. The internal combustion engine 10 includes a valve actuation system 30 operable to selectively open and close both the intake valve 24 and the exhaust valve 28. The valve actuation system 30 may include such systems as cam phasers, a two-step valve actuation system, a two-step valve actuation system with exhaust valve re-opening capability, a three-step valve actuation system, and a fully flexible valve actuation (FFVA) system to name a few. The exemplary valve actuation system 30 used hereinbelow to describe the various operating modes of the internal combustion engine 10 is one of a two-step, two-step with exhaust valve reopening capability, and three-step variable valve actuation mechanism employing both intake and exhaust cam phasing. The valve actuation events are controlled by an electronic control unit 32, which includes a programmable digital computer. The operation of such an electronic control unit 32 is well known to those skilled in the art of electronic control systems.

The piston 12 is connected to a crankshaft 38 through a connecting rod 40. The piston 12, connecting rod 40, and crankshaft 38 cooperate to translate the reciprocal motion of the piston 12 into rotational motion of the crankshaft 38. The angular rotation of the crankshaft is measured by a crankshaft position sensor 42. The crankshaft position sensor 42 communicates the angular position of the crankshaft 38 to the electronic control unit 32, where an engine speed determination is made. A direct fuel injector 44 is provided within the cylinder head 18 and is operable to selectively inject calibrated amounts of fuel directly into the combustion chamber 20 in response to commands by the electronic control unit 32. Additionally, the fuel injector 44 is operable to selectively provide multiple fuel injection events during each cycle of the internal combustion engine 10 in response to commands by the electronic control unit 32.

A spark plug 46 is provided within the cylinder head 18 and is responsive to commands by the electronic control unit 32. The spark plug 46 is operable to provide a spark within the combustion chamber 20 to initiate the combustion process of the fuel and air mixture, thereby enhancing the control of ignition timing over a large range of engine speed and load. While the internal combustion engine 10 does not require the spark plug 46 for most of the HCCI operating conditions, it may be desirable to employ the spark plug 46 to compliment the auto-ignition process. The spark plug 46 is especially beneficial during cold start-up and low load operation. Additionally, the spark plug 46 may be employed when the internal combustion engine 10 is operating under a high load in a controlled auto-ignition mode and when the internal combustion engine 10 is operating under a high load/speed in a throttled or non-throttled spark ignition mode.

Additionally, the electronic control unit 32 is configured to monitor a plurality of engine related inputs 47 from a plurality of transduced sources such as engine coolant temperature, ambient air temperature, intake manifold air temperature, intake oxygen percentage, air/fuel ratio, spark timing, EGR, operator toque requests, ambient pressure, intake manifold pressure (during throttled operation), displacement and position sensors for each of the intake and exhaust valves 24 and 28. The electronic control unit 32 further provides control commands for a variety of electrically controlled engine components as well as the performance of general diagnostic functions.

The preferred fueling methodology for the internal combustion engine 10 described hereinabove will now be described. As stated earlier, gasoline is the preferred fuel of the present invention, however other liquid and gaseous fuels are also candidates for direct injection. Additionally, it is contemplated that air assisted and other types of fuel delivery may be employed. Generally, at low and intermediate engine loads, split injection of the total fuel charge is commanded by the electronic control unit 32, whereas at higher engine loads a single injection of the total fuel charge is commanded by the electronic control unit 32. Additionally, it may be beneficial to reduce engine knock at the highest engine loads by commanding split injection of the total fuel charge. When operating in a split injection mode, the total fuel requirement for the engine cycle is divided into two injection events. One of the injection events is carried out early in the intake stoke where 10-30% of the total fuel charge is injected into the combustion chamber 20, while the remainder of the total fuel charge is subsequently injected during the other injection event, which is carried out during the compression stroke. Generally, the air/fuel ratio established by this first injection event is insufficient for auto-ignition within the combustion chamber 20. This second injection event enriches air/fuel ratio during a compression stroke to a sufficient degree to cause auto-ignition at low and intermediate engine loads.

Figure 2:
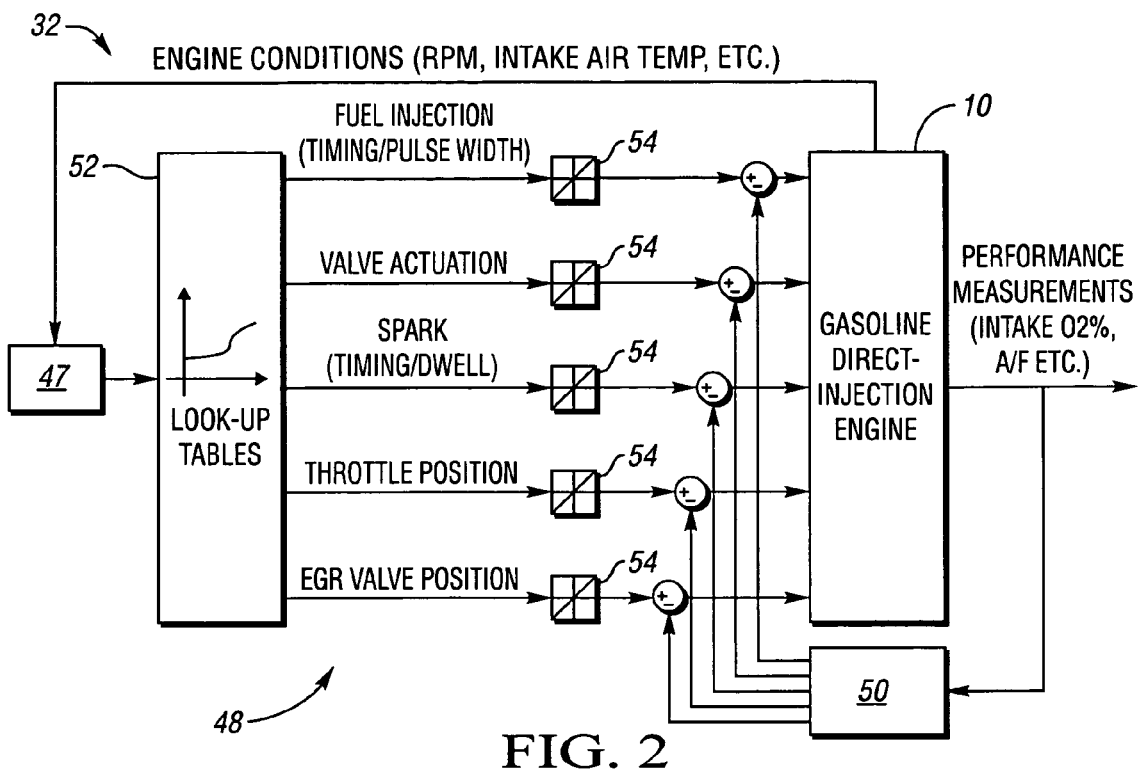
FIG. 2 is a schematic diagrammatic representation of a control system operable to command the internal combustion engine of FIG. 1 to operate with the methods of the present invention.

FIG. 2 is a schematic diagrammatic representation of a control system operable to command the internal combustion engine 10 to operate with the methods of engine operation of the present invention. The electronic control unit 32 includes a feed-forward control 48 and a feed-back control 50. The feed-forward control 48 is effective to achieve a fast system response and includes a look-up table 52 and a plurality of rate limiters 54. To control the combustion phasing, i.e. the location of peak pressure (LPP), in the selected combustion mode (SI vs. HCCI), fuel injection timing and pulse width, valve actuation (valve timing and lift profile), spark timing, throttle position, and EGR valve position values are calculated from the look-up tables 52 based on the values for inputs 47 and the desired engine operating conditions. The rate limiters 54 are employed to compensate for different operational dynamics within the system, e.g. air, fuel, and EGR dynamics.

The electronic control unit 32 is preferably configured to simultaneously control several degrees of freedom with several inputs, sometimes referred to as a multiple-input-multiple-output (MIMO) control system. The feed-back control 50 is utilized to further enhance the overall control system robustness. Each of the feed-forward control outputs are subject to offset by the feed-back control inputs prior to being communicated by the electronic control unit 32 to the internal combustion engine 10 as a command value. However, only a select few are needed in most cases. Further description of the operation of the feed-forward control 48 and feed-back control 50 during operation of the internal combustion engine 10 will be described in greater detail hereinbelow with reference to FIGS. 3 and 6.

Figure 3:
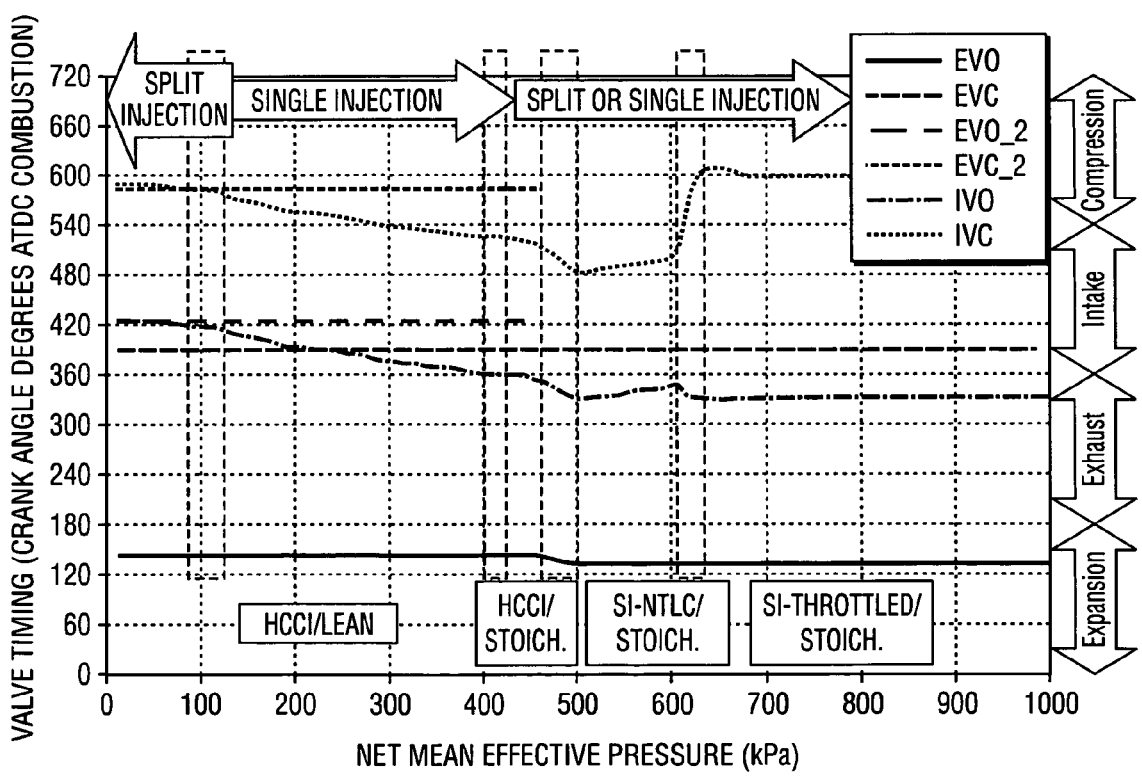
FIG. 3 illustrates exemplary intake and exhaust valve actuation, fuel injection strategy, and combustion modes as a function of engine load consistent with the present invention.

FIG. 3 is a graphical representation of an engine operating strategy consistent with the present invention, illustrating intake and exhaust valve timing as a function of engine load, employing an exhaust re-breathing valve actuation strategy. FIG. 3 illustrates the opening and closing timings of the exhaust valve 28 and the intake valve 24 of the internal combustion engine 10 while operating in both HCCI and SI combustion modes. A full 720 degrees, or two revolutions of the crankshaft, are plotted against the vertical axis beginning at 0 degrees corresponding to TDC combustion (i.e. position of the piston at the beginning of the expansion stroke (end of the compression stroke), and ending at 720 degrees corresponding to the same top dead center position at the end of the compression stroke (beginning of the expansion stroke). By convention, and as followed herein, the crankshaft angular positions 0 through 720 refer to degrees of crankshaft rotation after TDC of the expansion stroke. The sequentially repeated strokes are delineated across the right edge of FIG. 3 within double-ended arrows labeled EXPANSION, EXHAUST, INTAKE and COMPRESSION. Each of these strokes correspond to the piston motion between respective ones of TDC and BDC positions and covers a full 180 degrees of crankshaft rotation or one-quarter of the complete four-stroke cycle.

The internal combustion engine 10 operates with an exhaust re-breathing valve strategy using a two-step valve actuation system and a cam phasing system for the valve actuation system 30. FIG. 3 illustrates valve timing for both the intake valve 24 and the exhaust valve 28 as a function of engine load or net mean effective pressure (NMEP) at a constant engine speed of 1000 rpm. In FIG. 3, EVO/EVC and EVO_2/EVC_2 represent exhaust valve opening and closing timings for the main and re-breathing events, respectively, while IVO and IVC represent intake valve opening and closing timings, respectively. Additionally, transition regions between each of the various modes of engine operation are delimited by rectangles.

Also shown in FIG. 3 are the fuel injection strategy (split injection vs. single injection) and various combustion modes as a function of engine load. In particular, the internal combustion engine 10 is operated in controlled auto-ignition combustion mode, or HCCI mode, with a lean of stoichiometric air/fuel mixture (HCCI/Lean) below 420 kPa NMEP. During this combustion mode, the intake valve timing advances with increasing engine load causing the level of in-cylinder vacuum to reduce. Further, the oxides of nitrogen, or NOx, emission index increases with increasing engine load. For engine loads below approximately 115 kPa NMEP, the split injection fueling strategy is employed. For engine loads between approximately 115 kPa NMEP and 420 kPa NMEP the single injection fueling strategy is employed. At approximately 420 kPa NMEP, the NOx emission index is around 1 gram per kilogram of fuel burned.

For engine loads between 420 and 470 kPa NMEP, the internal combustion engine 10 is operated in controlled auto-ignition combustion mode with a stoichiometric air/fuel ratio (HCCI/Stoich) to allow the use of conventional after treatment device for NOx emission control, such as a three-way catalyst. The split injection fueling strategy is again used to control the onset of engine knock. Above 470 kPa NMEP, the internal combustion engine 10 is operated in spark-ignition, non-throttled load control mode of operation with a stoichiometric air/fuel mixture (SI-NTLC/Stoich) using a typical production exhaust valve lift profile and a short-duration, low-lift intake valve profile with early intake valve closing for engine load control. The intake valve lift profile will obviate the need for engine load control using a throttle valve, thereby reducing the efficiency loss due to pumping work. The single or split injection fueling strategy, once optimized, will achieve essentially the same engine performance. Beyond 600 kPa NMEP, the internal combustion engine 10 is operated in traditional SI throttled mode with a stoichiometric air/fuel mixture (SI-Throttled/Stoich) using a typical production exhaust and intake valve lift profiles. The single or split injection fueling strategy may be employed at engine loads above 600 kPa NMEP. Near full engine load, it may be beneficial to use the split injection fueling strategy to prevent the onset of engine knock. Additionally, a rich of stoichiometric air/fuel ratio may be commanded for engine component protection and/or performance improvements. The above-mentioned engine operating strategy is enabled by the use of a two-step valve actuation mechanism where intake valve and exhaust valve lift profiles can be varied independently of one another.

Referring to FIGS. 4a through 4d, and with continued reference to FIGS. 1 through 3, there is shown representative exhaust and intake valve lift profiles, as a function of crankshaft angle, used for engine operation during HCCI, HCCI to SI/NTLC transition, SI/NTLC, and SI/NTLC to SI throttled transition mode of operation, respectively. In similar fashion with respect to FIG. 3, the sequentially repeated strokes are delineated across the top of FIGS. 4a through 4d within double-ended arrows labeled EXPANSION, EXHAUST, INTAKE and COMPRESSION. Additionally, arrows indicating directions of increasing engine load are indicated on each of the FIGS. 4a through 4d.

Figure 4A:
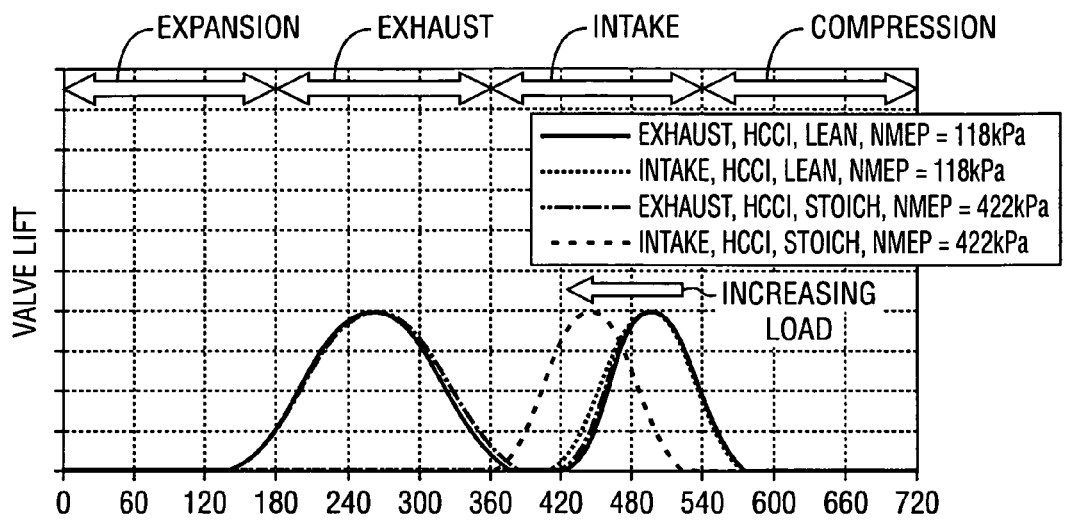
FIG. 4a is a graphical representation of intake valve lift and exhaust valve lift as a function of crankshaft angle and engine load for a homogeneous charge compression ignition (HCCI) mode consistent with the engine operating strategy of FIG. 3 and employing a two-step valve actuation system and a cam phasing system.
Figure 4B:
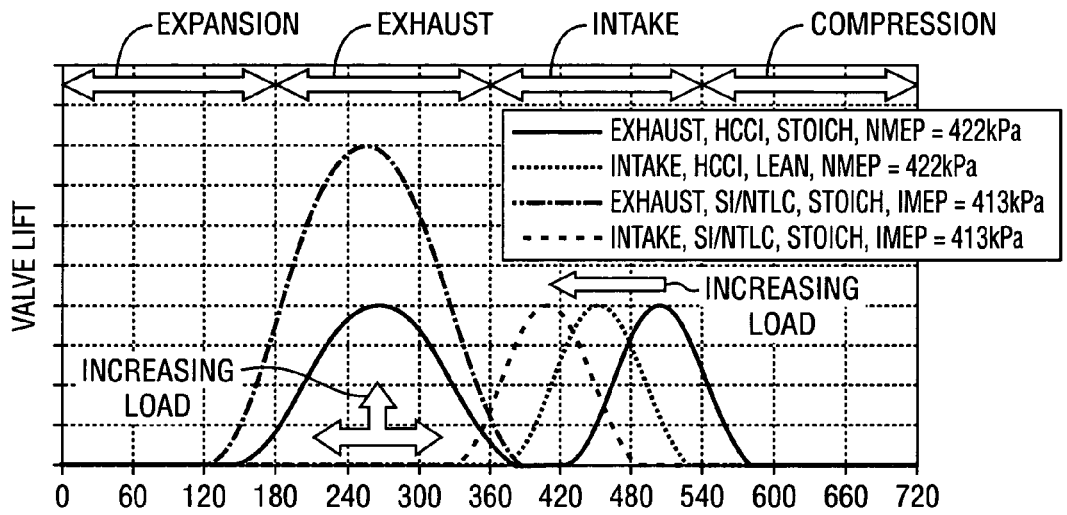
FIG. 4b is a graphical representation of intake valve lift and exhaust valve lift as a function of crankshaft angle and engine load for a HCCI mode to spark ignited non-throttled load control (SI/NTLC) mode transition consistent with the engine operating strategy of FIG. 3 and employing a two-step valve actuation system and a cam phasing system.

FIG. 4a illustrates that intake valve timing advances with increasing engine load during the HCCI mode of operation. In other words, in-cylinder vacuuming due to late intake valve opening reduces with increasing engine load. During the HCCI mode of operation, both the intake and exhaust valves, 24 and 28, operate in a low lift mode. Additionally, the exhaust valve lift profile has a double opening characteristic, i.e. the exhaust valve 28 reopens again for at least a portion of the intake stroke, to allow exhaust gas to be reintroduced to the combustion chamber 20 during the intake stroke. During transition between HCCI and SI/NTLC mode of operation, shown in FIG. 4b, the exhaust valve lift profile requires a change from double to single opening, with the main exhaust valve lift profile having lift, duration, and timing changes. As engine load increases through the transition, the exhaust valve 28 will operate in a high lift mode and will phase to a slightly more advanced timing. Additionally, the duration of the exhaust valve opening event will increase. The intake valve lift profile will phase to a more advanced timing.

Figure 4C:
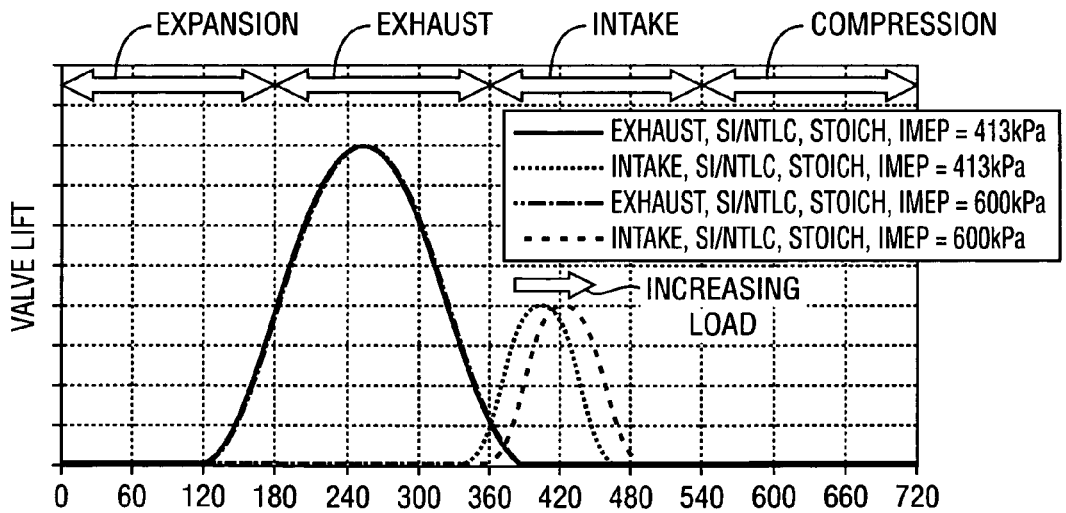
FIG. 4c is a graphical representation of intake valve lift and exhaust valve lift as a function of crankshaft angle and engine load for the SI/NTLC mode consistent with the engine operating strategy of FIG. 3 and employing a two-step valve actuation system and a cam phasing system.
Figure 4D:
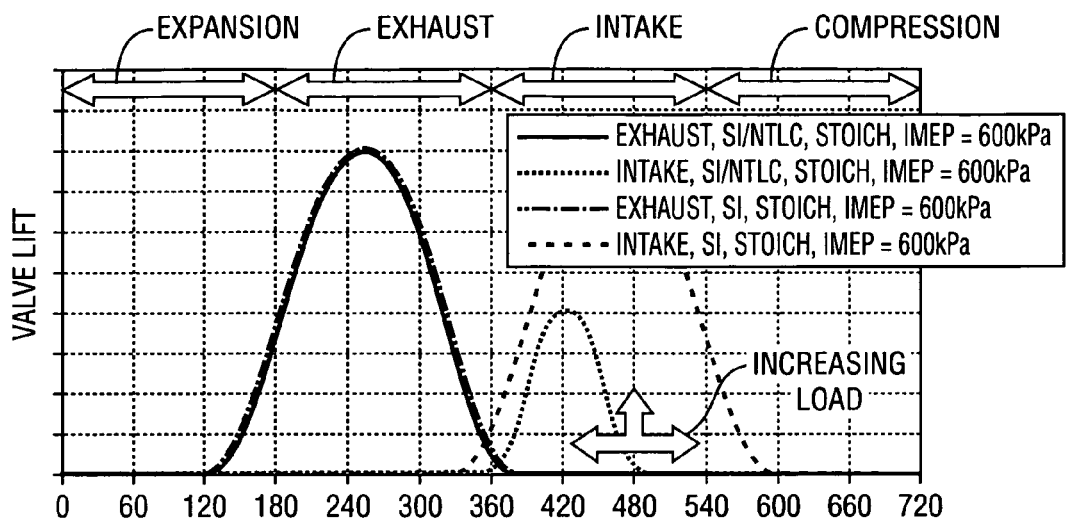
FIG. 4d is a graphical representation of intake valve lift and exhaust valve lift as a function of crankshaft angle and engine load for the SI/NTLC mode to spark ignited (SI) throttled mode transition consistent with the engine operating strategy of FIG. 3 and employing a two-step valve actuation system and a cam phasing system.

FIG. 4c illustrates that when operating in the SI/NTLC mode of operation the intake valve timing will retard with increasing engine load, thereby reducing the overlap between the exhaust valve lift pofile and the intake valve lift profile. This operates to vary the amount of intake air introduced to the combustion chamber 20 during the intake stroke such that a throttled engine operation for load control is obviated. As stated earlier, by operating the internal combustion engine 10 in a non-throttled mode, the efficiency of the internal combustion engine 10 will increase due to decreases in pumping loss. During the transition from SI/NTLC to SI throttled mode of operation, shown in FIG. 4d, the intake valve lift profile requires both lift, duration, and timing changes while the exhaust valve lift profile remains the same. As shown in FIG. 4d, the intake valve lift will move from a low lift mode to a high lift mode as engine load increases during the transition. Further, the duration will increase and the intake valve timing will retard as engine load increases during the transition. When operating in the SI throttled mode, throttle valve position and spark timing are sufficient for engine load control, thereby allowing the exhaust valve and intake valve lift profiles to revert to a typical production, or high lift, setting.

Figure 5A:
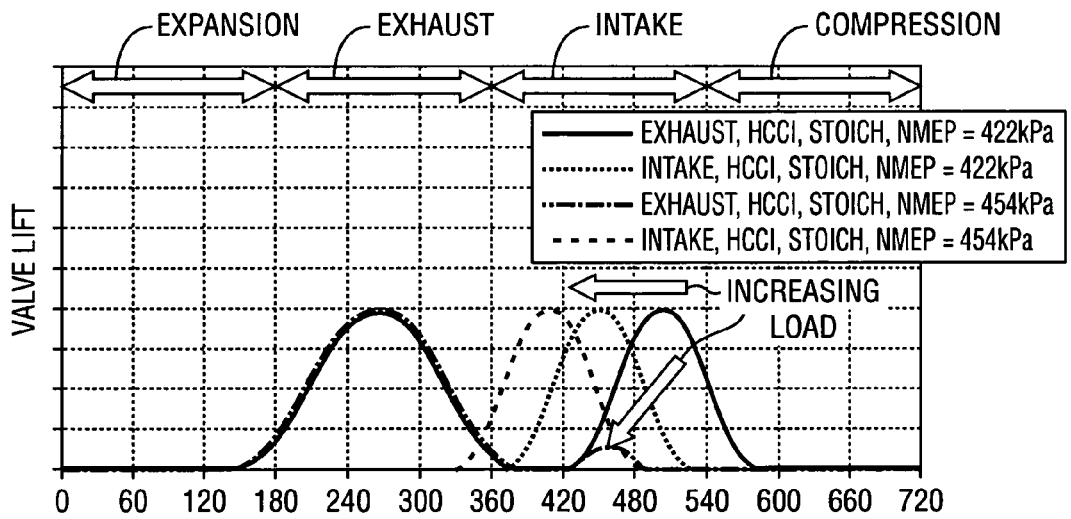
FIG. 5a is a graphical representation of intake valve lift and exhaust valve lift as a function of crankshaft angle and engine load for a stoichiometric HCCI mode consistent with the engine operating strategy of FIG. 3 and employing a two-step valve actuation system, a cam phasing system, and variable re-breathing exhaust valve lift capability.
Figure 5B:
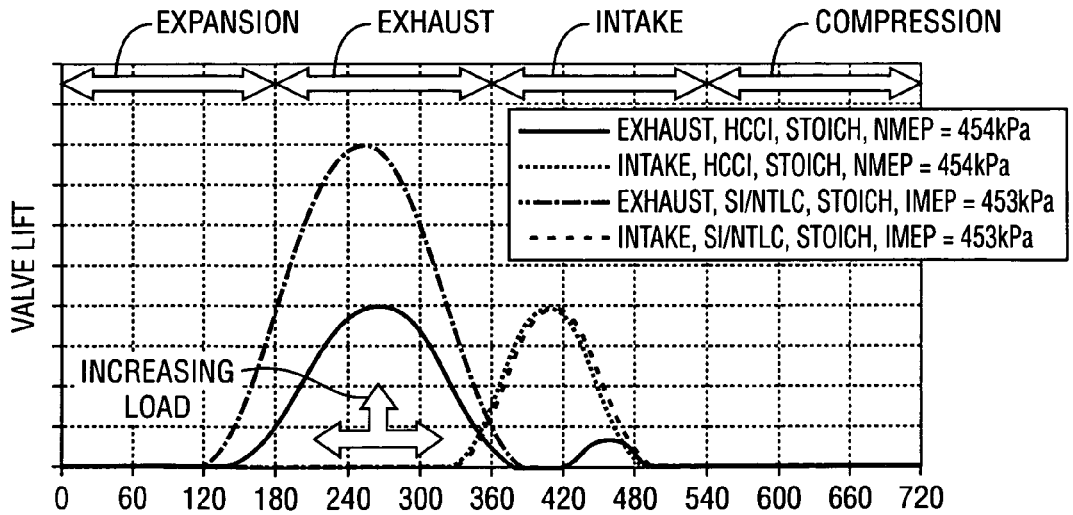
FIG. 5b is a graphical representation of intake valve lift and exhaust valve lift as a function of crankshaft angle and engine load for a stoichiometric HCCI mode to SI/NTLC transition consistent with the engine operating strategy of FIG. 3 and employing a two-step valve actuation system, a cam phasing system, and variable re-breathing exhaust valve lift capability.

The range of engine operation in the HCCI/Stoich mode can be extended if a mechanism for variable exhaust re-breathing lift control is available as demonstrated by FIGS. 5a and 5b. In particular, HCCI combustion is possible at higher NMEP values with a combination of lower re-breathing lift and advanced intake timing as shown in FIG. 5a. A transition to SI/NTLC is achieved, as shown in FIG. 5b, by changing only the exhaust valve lift profile. The remaining engine operation in HCCI mode is the same as that shown in FIG. 4a, while the remaining engine operation in SI/NTLC and SI throttled mode of operation is the same as that described in FIGS. 4c and 4d, respectively.

Control of engine operation during each of the engine operating modes described hereinabove with reference to FIG. 3 is dependent on both the feed-forward control 48 and the feed-back control 50, shown in FIG. 2. During the HCCI mode of operation with lean of stoichiometric air/fuel ratios, the feed-forward control 48 will employ the lookup tables 52; more specifically, look up tables having representative values for fuel injection (timing and pulse width), spark timing, and variable valve actuation parameters. To maintain combustion stability, the feed-back control 50 operates to control the location of peak pressure, or LPP, within the combustion chamber 20 by feeding back values of variable valve actuation. Additionally the air/fuel ratio is controlled by feeding back values of variable valve actuation and throttle position. As the engine operating mode transitions from HCCI lean of stoichiometric to HCCI stoichiometric, the feed-back control 50 controls the percentage of oxygen within the intake, the air/fuel ratio, and the LPP by feeding back values of EGR, variable valve actuation, throttle position, and fuel injection timing by employing MIMO control.

When operating in the HCCI, stoichiometric air/fuel ratio mode of engine operation, the feed-forward control 48 will employ the lookup tables 52; more specifically, look up tables having representative values for fuel injection (timing and pulse width), spark timing, variable valve actuation parameters, EGR, and throttle position. The feed-back control 50 operates to control the LPP, the percentage of oxygen within the intake, and air/fuel ratio by feeding back values of EGR, variable valve actuation, throttle position, spark timing, and fuel injection timing by employing MIMO control. Additionally, as the engine operating mode transitions from HCCI stoichiometric to the SI/NTLC mode of operation, the feed-back control 50 operates to control the LPP, the percentage of oxygen within the intake, and air/fuel ratio by feeding back values of EGR, variable valve actuation, throttle position, spark timing, and fuel injection timing by employing MIMO control.

When operating in the SI/NTLC mode of engine operation, the feed-forward control 48 will employ the lookup tables 52; more specifically, look up tables having representative valves for fuel injection (timing and pulse width), spark timing, and variable valve actuation parameters. The feed-back control 50 operates to control the LPP, the percentage of oxygen within the intake, and air/fuel ratio by feeding back values of EGR, variable valve actuation, throttle position, spark timing, and fuel injection timing by employing MIMO control. Additionally, as the engine operating mode transitions from the SI/NTLC mode to the SI throttled mode, the feed-back control 50 operates to control the LPP, the percentage of oxygen within the intake, and air/fuel ratio by feeding back values of fuel injection pulse width, EGR, variable valve actuation, throttle position, and fuel injection timing by employing MIMO control.

When operating in the SI throttled mode of engine operation, the feed-forward control 48 will employ the lookup tables 52; more specifically, look up tables having representative valves for fuel injection (timing and pulse width), spark timing, and throttle position. The feed-back control 50 operates to control the LPP by feeding back measured values for spark timing and fuel injection timing. Additionally, the air/fuel ratio is controlled by feeding back measured values of throttle position, fuel injection pulse width, and EGR. Although the above discussions focused primarily on engine operations with engine load transients, the present invention works equally well with engine speed transients.

Transient characteristics of the present invention may be controlled in one of three ways. The first method employs a two-step valve actuation system in conjunction with a cam phasing system. The two-step mechanism operates to change either intake or exhaust lift profiles within one engine cycle. During transition, the lean of stoichiometric excursion during combustion mode transitions, for example, from HCCI to SI/NTLC (FIG. 4b) or from SI/NTLC to SI throttled operation (FIG. 4d) may become so large that it may cause a misfire condition or partial burn. Feed-back control using measured air/fuel ratio to dynamically control the throttle position and fuel injection is required. A feed-back tracking/regulation mechanism is used to control the air/fuel ratio within the desired range. Additionally, EGR can also be used to some extent; however, it can pose adverse effect on combustion stability if the air and fuel mixture becomes excessively dilute. During the transition process, it is desirable to reduce the noise, vibration, and harshness (NVH) while maintaining stable combustion. Thus, the throttle progression and fuel injection rate should be controlled to reduce NVH.

The second method employs a two-step valve actuation system, a cam phasing system, and a variable re-breathing exhaust valve lift control as demonstrated in FIGS. 5a and 5b. Control of delivered air/fuel ratio and combustion during combustion mode transition from HCCI to SI/NTLC (FIG. 5b) can be achieved with proper matching of EGR and throttle valve position change rates and variable valve actuation change rate. In other words, close coordination between EGR rate, throttle position, and instantaneous exhaust re-breathing lift may be needed to control the amount of intake air communicated to the combustion chamber 20. If a fully flexible valve actuation (FFVA) device is available, the amount of intake air introduced to the combustion chamber 20 during the engine operating mode transitions can be controlled by the FFVA alone. It can be used to further extend the range of HCCI or SI/NTLC or eliminate throttled operation for both HCCI and SI modes.

The third method employs a flow control or swirl control valve within the intake system of the internal combustion engine 10. Such a device is described in U.S. patent application Ser. No. 10/981,971, filed Nov. 5, 2004, which is hereby incorporated by reference in its entirety. The swirl control valve, when used in one branch of the intake runners in a two-intake-valve per cylinder internal combustion engine, can be used for air/fuel ratio control. Variation of the flow control valve setting has an effect on the amount of fresh charge inducted into the cylinder and therefore the delivered air/fuel ratio. The effectiveness of the flow control valve on air/fuel ratio control is dependent on engine speed. In particular, closing the flow control valve may result in lower delivered air/fuel ratio and the rate of reduction increases with increasing engine speed.

Figure 6:
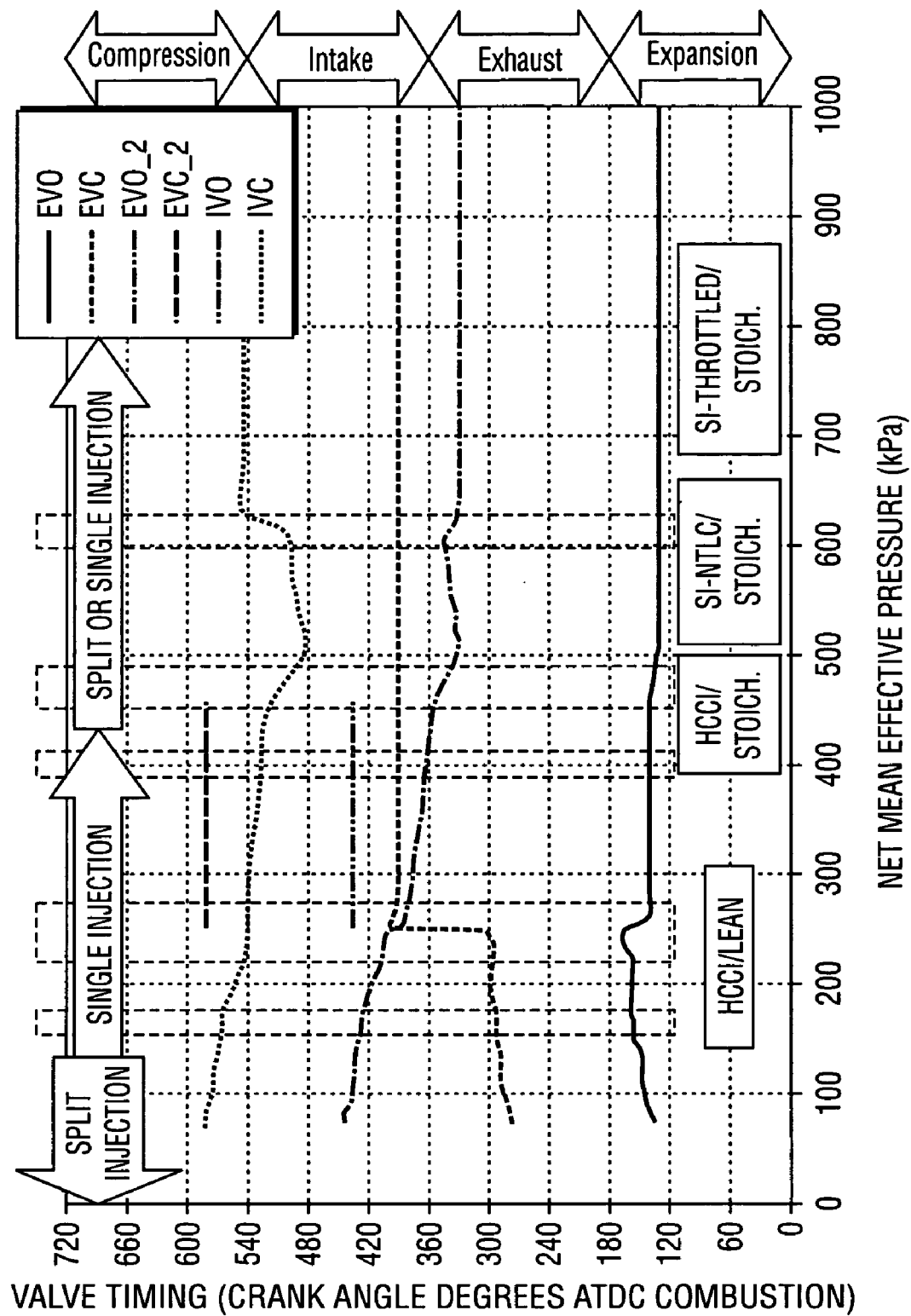
FIG. 6 illustrates exemplary intake and exhaust valve actuation, fuel injection strategy, and combustion loads as a function of engine load consistent with the present invention.

FIG. 6 is a graphical representation of an engine operating strategy, illustrating intake and exhaust valve timing as a function of engine load, employing a hybrid valve actuation strategy with an exhaust re-compression (Re-Compr.) and re-breathing (Re-BR.) hybrid valve actuation strategy consistent with the present invention. Control of the motion of the intake and exhaust valves, 24 and 28, of the internal combustion engine 10 operating with both HCCI and SI modes of operation is accomplished using either a two-step valve actuation system with exhaust valve reopening capability or a three-step valve actuation system and a cam phasing system. The intake and exhaust valve timing is plotted as a function of engine load (NMEP) at a constant engine speed of 1000 rpm. In FIG. 6, EVO/EVC and EVO_2/EVC_2 represent the exhaust valve opening and closing timings for the main and re-breathing events, respectively, while IVO and IVC represent the intake valve opening and closing timings, respectively. The sequentially repeated strokes are delineated across the right edge of FIG. 6 within double-ended arrows labeled EXPANSION, EXHAUST, INTAKE and COMPRESSION. Additionally, transition regions between each of the various modes of engine operation are delimited by rectangles.

Also shown in FIG. 6 are the fuel injection strategy (split injection vs. single injection) and the various engine operating modes as a function of engine load. In particular, the internal combustion engine 10 is operated in the HCCI operating mode with lean air/fuel mixture (HCCI/Lean) using an exhaust re-compression valve strategy below 250 kPa NMEP. During this mode of operation, negative valve overlap decreases with increasing engine load. At 250 kPa NMEP, a transition from exhaust re-compression to exhaust re-breathing valve strategy occurs, thereby driving a change to the exhaust valve and intake valve lift profiles. The exhaust valve lift profile changes from single to double opening while the intake duration increases by approximately 40 degrees. Between 250 and 420 kPa NMEP, the intake timing advances with increasing engine load causing the level of in-cylinder vacuum to reduce. Further, the NOx emission index increases with increasing engine load. At 420 kPa NMEP, the NOx emission index is approximately 1 gram per kilogram of fuel burned. For engine loads between 420 and 470 kPa NMEP, the internal combustion engine 10 is operated in the HCCI operating mode with a stoichiometric air/fuel ratio (HCCI/Stoich) to allow the use of conventional after treatment device for NOx control, such as a three-way catalyst. A split injection fueling strategy is again used to prevent the onset of engine knock. Above 470 kPa NMEP, the internal combustion engine 10 is operated in the spark-ignition, non-throttled combustion mode with stoichiometric air/fuel mixture (SI-NTLC/Stoich) using a typical production exhaust valve lift profile and a short-duration, low-lift intake valve profile with early intake valve closing for load control. This intake valve operating strategy will obviate the need for load control using a throttle valve, thereby reducing the efficiency loss due to pumping work. A single or split injection fueling strategy, once optimized, will achieve essentially the same engine performance. Beyond 600 kPa NMEP, the internal combustion engine 10 is operated in traditional SI throttled mode with a stoichiometric air/fuel mixture using typical production exhaust and intake lift profiles. A single or split injection fueling strategy may be employed. However, near full load, it may be beneficial to use the split injection fueling strategy for the prevention of engine knock. Additionally, a rich of stoichiometric air/fuel mixture may be used for engine component protection and/or performance improvements. The above-mentioned engine operating strategy employs either a two-step mechanism with exhaust valve reopening capability or a three-step mechanism wherein both intake and exhaust lift profiles can be independently varied.

Figure 7A:
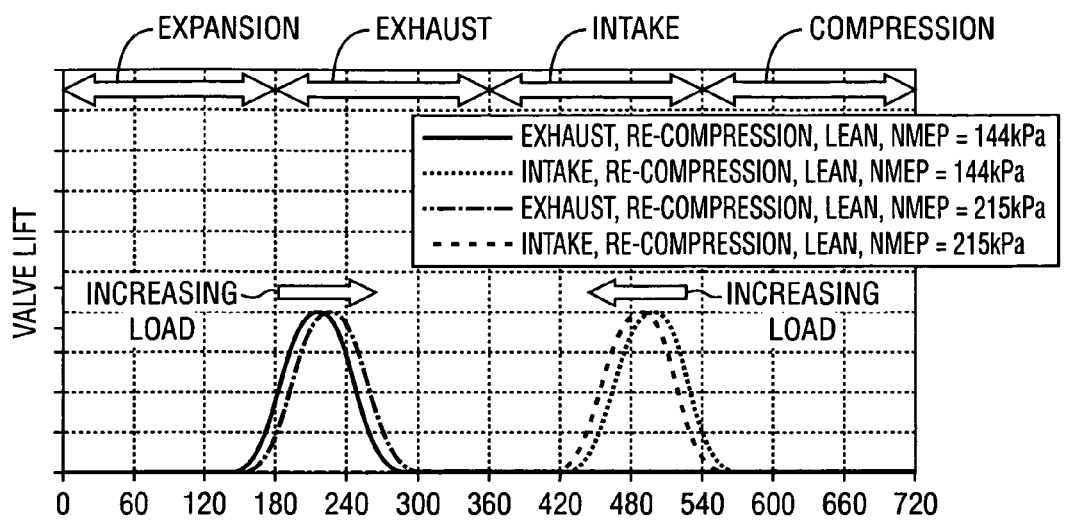
FIG. 7a is a graphical representation of intake valve lift and exhaust valve lift as a function of crankshaft angle and engine load for the lean of stoichiometric HCCI mode with exhaust re-compression consistent with the engine operating strategy of FIG. 6 and employing either a two-step valve actuation system with exhaust valve reopening capability or a three-step valve actuation system and a cam phasing system.
Figure 7B:
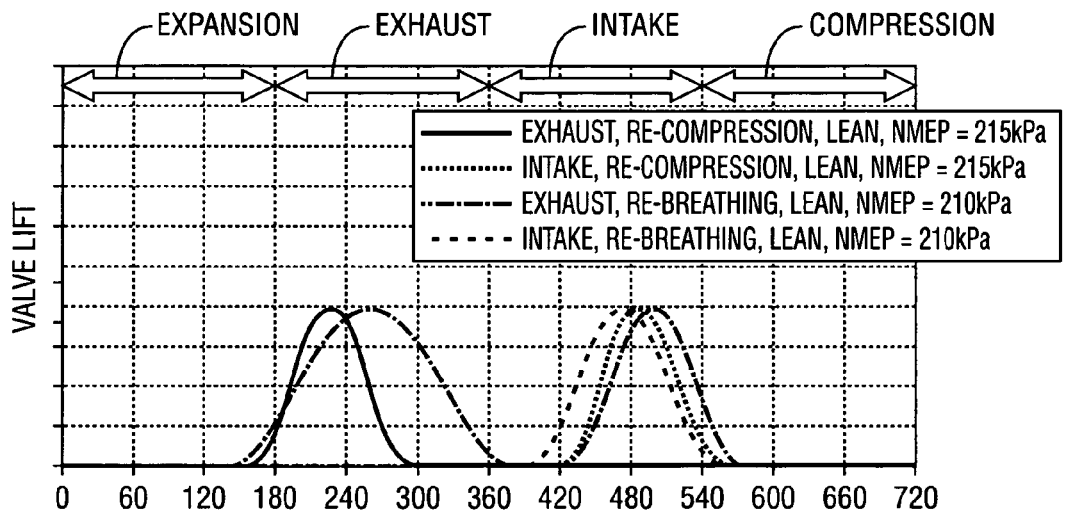
FIG. 7b is a graphical representation of intake valve lift and exhaust valve lift as a function of crankshaft angle and engine load for a lean of stoichiometric HCCI mode illustrating an exhaust re-compression to exhaust re-breathing transition consistent with the engine operating strategy of FIG. 6 and employing either a two-step valve actuation system with exhaust valve reopening capability or a three-step valve actuation system and a cam phasing system.
Figure 7C:
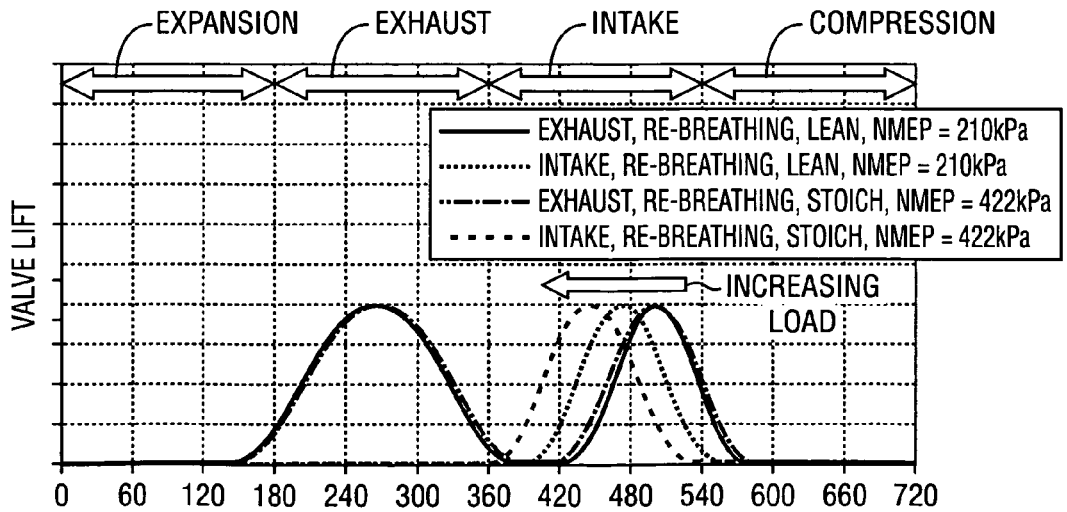
FIG. 7c is a graphical representation of intake valve lift and exhaust valve lift as a function of crankshaft angle and engine load for a lean of stoichiometric and stoichiometric HCCI mode illustrating exhaust re-breathing consistent with the engine operating strategy of FIG. 6 and employing either a two-step valve actuation system with exhaust valve reopening capability or a three-step valve actuation system and a cam phasing system.

FIGS. 7a-7c show representative exhaust and intake valve lift profiles for engine operation under the HCCI/Re-Compr./Lean, HCCI/Re-Compr. to HCCI/Re-Br. Transition, and HCCI/Re-Br. operating modes, respectively. FIG. 7a illustrates that the exhaust valve timing retards, while the intake valve timing advances with increasing engine load below 215 kPa NMEP while operating the internal combustion engine 10 in the HCCI/Re-Compr. mode of operation. As illustrated in FIG. 7b, during the HCCI/Re-Compr. to HCCI/Re-Br. transition, both exhaust and intake valve profiles are changed. In particular, the exhaust profile is switched from single to double opening to allow exhaust re-breathing, while the intake duration is increased from 120 to 160 degrees. When operating the internal combustion engine 10 in the HCCI/Re-Br. engine operating modes, shown in FIG. 7c, intake timing advances alone are sufficient for controlling engine load. The remaining engine operation modes, i.e. those modes above 470 kPa NMEP, are the same as those shown in FIGS. 4b, 4c, and 4d and described hereinabove.

Control of engine operation during each of the engine operating modes described hereinabove with reference to FIG. 6 is dependent on both the feed-forward control 48 and the feed-back control 50, shown in FIG. 2. During the HCCI mode of operation with lean of stoichiometric air/fuel ratios and exhaust re-compression, the feed-forward control 48 will employ the lookup tables 52; more specifically, look up tables having representative values for fuel injection (timing and pulse width), spark timing, and variable valve actuation parameters. The feed-back control 50 operates to control the LPP, by feeding back values of variable valve actuation. Additionally, the air/fuel ratio is controlled by feeding back values of variable valve actuation and throttle position. As the engine operating mode transitions from HCCI lean of stoichiometric with exhaust re-compression to HCCI lean of stoichiometric with exhaust re-breathing, the feed-back control 50 operates to control the LPP, by feeding back values of variable valve actuation. Additionally, the air/fuel ratio is controlled by feeding back values of variable valve actuation and throttle position.

When operating in the HCCI lean of stoichiometric with exhaust re-breathing mode of operation, the feed-forward control 48 will employ the lookup tables 52; more specifically, look up tables having representative values for fuel injection (timing and pulse width), spark timing, and variable valve actuation parameters. The feed-back control 50 operates to control the LPP, by feeding back values of variable valve actuation. Additionally, the air/fuel ratio is controlled by feeding back values of variable valve actuation and throttle position. As the engine operating mode transitions from HCCI lean of stoichiometric with exhaust re-breathing to HCCI stoichiometric with exhaust re-breathing, the feed-back control 50 operates to control the LPP, the percentage of oxygen within the intake, and air/fuel ratio by feeding back values of EGR, variable valve actuation, throttle position, spark timing, and fuel injection timing by employing MIMO control.

When operating in the HCCI stoichiometric with exhaust re-breathing mode of engine operation, the feed-forward control 48 will employ the lookup tables 52; more specifically, look up tables having representative valves for fuel injection (timing and pulse width), spark timing, variable valve actuation parameters, EGR, and throttle position. The feed-back control 50 operates to control the LPP, the percentage of oxygen within the intake, and air/fuel ratio by feeding back values of EGR, variable valve actuation, throttle position, spark timing, and fuel injection timing by employing MIMO control. The remaining operating modes such as the transition from HCCI to SI/NTLC, and the transition from SI/NTLC to SI throttled follow the same feed-back and feed-forward control as discussed herein above with reference to FIG. 3. Although the above discussions focused primarily on engine operations with engine load transients, the present invention works equally well with engine speed transients.

Transient characteristics of the present invention are controlled in one of three ways. The first method employs a three-step valve actuation system in conjunction with a cam phasing system. The valve actuation mechanism operates to change intake valve or exhaust valve lift profiles within one engine cycle during a transition. The lean of stoichiometric excursion that may occur during operating mode transitions, for example, from re-compression HCCI to re-breathing HCCI, from re-breathing HCCI to SI/NTLC, and from SI/NTLC to SI throttled operation, may become so large that a misfire condition or partial burn may occur. Feed-back control using measured air/fuel ratio to dynamically control the throttle valve position and fuel injection is required. A feed-back tracking/regulation mechanism is used to control the air/fuel ratio within the desired range. The EGR valve can also be used to some extent; however, it can pose adverse effect on combustion stability if the unburned charge or air and fuel mixture becomes excessively dilute. During the transition process, it is desirable to reduce the NVH while maintaining stable combustion. Thus, the throttle progression and fuel injection rate should be controlled to reduce NVH.

The second method employs a variable valve actuation system. Control of delivered air/fuel ratio and combustion during combustion mode transition from HCCI to SI/NTLC can be achieved with proper matching of EGR and throttle valve position change rates and variable valve actuation. In other words, close coordination between EGR rate, throttle position, and instantaneous intake valve or exhaust valve lift profile may be needed to control the amount of intake air communicated to the combustion chamber 20. A feed-back control with the amount of fuel injected can also be used. If a fully flexible valve actuation (FFVA) device is available, the amount of intake air communicated to the combustion chamber 20 during the operating mode transitions can be controlled by the FFVA alone. It can be used to further extend the range of HCCI or SI/NTLC or eliminate throttled operation for both HCCI and SI modes.

The third method employs a flow control or swirl control valve within the intake system, such as that described in U.S. patent application Ser. No. 10/981,971 incorporated by reference hereinabove, of the internal combustion engine 10. The swirl control valve used in one branch of the intake runners in a two-intake-valve per cylinder internal combustion engine can be used for air/fuel ratio control. Variation of the flow control valve setting has an effect on the amount of fresh charge inducted into the cylinder and therefore the delivered air/fuel ratio. The effectiveness of the flow control valve on air/fuel ratio control is dependent on engine speed. In particular, closing the flow control valve may result in lower delivered air/fuel ratio and the rate of reduction increases with increasing engine speed.

Those skilled in the art will recognize that different engines have different operating characteristics. As such, the engine load points for transitioning from one operating mode to another are merely exemplary in nature and are not meant to limit the present invention. While the best modes for carrying out the invention have been described in detail, those familiar with the art to which this invention relates will recognize various alternative designs and embodiments for practicing the invention within the scope of the appended claims.

The invention claimed is:

1. A method of operating a four-stroke direct injection internal combustion engine having a combustion chamber, an intake valve having an intake valve profile defining a lift, timing, and duration, and an exhaust valve having an exhaust valve profile defining a lift, timing, and duration, said method comprising:
operating the internal combustion engine in a homogeneous charge compression ignition mode when engine load is at or below a first predetermined value;
operating the internal combustion engine in a spark ignited non-throttled load control mode when engine load is above said first predetermined value and below a second predetermined value; and
operating the internal combustion engine in a spark ignited throttled mode when engine load is at or above said second predetermined value.

2. The method of claim 1, further comprising:
operating the internal combustion engine with a generally lean of stoichiometric air/fuel ratio for a low engine load portion of said homogeneous charge compression ignition mode; and
subsequently, operating the internal combustion engine with a generally stoichiometric air/fuel ratio for a high engine load portion of said homogeneous charge compression ignition mode.

3. The method of claim 2, further comprising:
injecting fuel into the combustion chamber at least twice during each cycle of the internal combustion engine when the internal combustion engine is operating in said low engine load portion of said homogeneous charge compression ignition mode.

4. The method of claim 1, further comprising:
actuating the exhaust valve in an exhaust re-breathing mode for at least a portion of said homogeneous charge compression ignition mode, wherein said exhaust valve has a main opening event during at least a portion of the exhaust stroke of the engine and a reopening event during at least a portion of the intake stroke of the engine.

5. The method of claim 1, further comprising:
actuating the intake valve and exhaust valve in an exhaust re-compression mode for at least a portion of said homogeneous charge compression ignition mode, wherein negative valve overlap decreases with increasing engine load.

6. The method of claim 1, further comprising:
injecting fuel into the combustion chamber at least twice during each cycle of the internal combustion engine when the internal combustion engine is operating in at least one of said spark ignited non-throttled load control mode and said spark ignited throttled mode.

7. The method of claim 1, further comprising:
transitioning between said homogeneous charge compression ignition mode and said spark ignited non-throttled load control mode by advancing the exhaust valve timing while increasing the lift and duration of the exhaust valve profile as engine load increases and advancing the intake valve timing as engine load increases.

8. The method of claim 1, further comprising:
retarding the intake valve timing during said spark ignited non-throttled load control mode to control the amount of intake air communicated to the combustion chamber.

9. The method of claim 1, further comprising:
transitioning between said spark ignited non-throttled load control mode and said spark ignited throttled mode by retarding the intake valve timing while increasing the lift and duration of the intake valve profile as engine load increases.

10. The method of claim 4, wherein operating the internal combustion engine in said homogeneous charge compression ignition mode includes advancing the intake valve timing as engine load increases and advancing the exhaust valve timing while decreasing the lift and duration of the exhaust valve profile during said reopening event as engine load increases.

11. The method of claim 1, wherein the operating modes of the internal combustion engine are controlled by an electronic control unit having both a feed-forward control and a feed-back control.

12. The method of claim 1, further comprising:
providing a spark within the combustion chamber for at least a portion of said homogeneous charge compression ignition mode.

13. A method of operating an internal combustion engine having a combustion chamber and controllable by an electronic control unit having a feed-forward control having a plurality of look up tables and a feed-back control, the method comprising:
operating the internal combustion engine in a homogeneous charge compression ignition mode when engine load is at or below a first predetermined value;

operating the internal combustion engine in a spark ignited non-throttled load control mode when engine load is above said first predetermined value and below a second predetermined value;

providing feed-forward command values, via the plurality of lookup tables, to the internal combustion engine for at least one of fuel injection pulse width, fuel injection timing, spark timing, spark dwell, and variable valve actuation control;

controlling, via the feed-back control, at least one of the location of peak pressure within the combustion chamber, intake air oxygen percentage, and air/fuel ratio values using at least one of exhaust gas recirculation, variable valve actuation, throttle position, spark dwell, spark timing, fuel injection timing, and fuel injection pulse width values;

operating the internal combustion engine in a spark ignited throttled mode when engine load is at or above said second predetermined value;

providing feed-forward command values, via the plurality of lookup tables, to the internal combustion engine for at least one of fuel injection pulse width, fuel injection timing, spark timing, spark dwell, variable valve actuation control, exhaust gas recirculation, and throttle position; and controlling, via the feed-back control, the location of peak pressure within the combustion chamber using at least one of spark timing, spark dwell, injection timing, and fuel injection pulse width, and further controlling, via the feed-back control, the air/fuel ratio using at least one of throttle position, fuel injection pulse width, fuel injection timing, and exhaust gas recirculation values.

14. The method of claim 13, further comprising operating the internal combustion engine with a lean of stoichiometric air/fuel ratio for a low engine load portion of said homogeneous charge compression ignition mode;

providing feed-forward command values, via the plurality of lookup tables, to the internal combustion engine for at least one of fuel injection pulse width, fuel injection timing, spark timing, spark dwell, and variable valve actuation;

controlling, via the feed-back control, the location of peak pressure within the combustion chamber using variable valve actuation values and controlling, via feed-back control, the air/fuel ratio using at least one of variable valve actuation and throttle position values;

subsequently, operating the internal combustion engine with a stoichiometric air/fuel ratio for a high engine load portion of said homogeneous charge compression ignition mode;

providing feed-forward command values, via the plurality of lookup tables, to the internal combustion engine for at least one of fuel injection pulse width, fuel injection timing, spark timing, spark dwell, variable valve actuation control, exhaust gas recirculation, and throttle position; and controlling, via the feed-back control, at least one of the location of peak pressure within the combustion chamber, intake air oxygen percentage, and air/fuel ratio values using at least one of exhaust gas recirculation, variable valve actuation, throttle position, spark dwell, spark timing, fuel injection timing, and fuel injection pulse width values.

15. The method of claim 14, further comprising:
transitioning between said low engine load portion of said homogeneous charge compression ignition mode and said high engine load portion of said homogeneous charge compression ignition mode by controlling, via the feed-back control, at least one of the location of peak pressure within the combustion chamber, intake air oxygen percentage, and air/fuel ratio values using at least one of exhaust gas recirculation, variable valve actuation, throttle position, fuel injection timing, and fuel injection pulse width values.

16. The method of claim 13, further comprising:
transitioning between said homogeneous charge compression ignition mode and said spark ignited non-throttled load control mode and between said spark ignited non-throttled load control mode and said spark ignited throttled mode by controlling, via the feed-back control, at least one of the location of peak pressure within the combustion chamber, intake air oxygen percentage, and air/fuel ratio values using at least one of exhaust gas recirculation, variable valve actuation, throttle position, fuel injection timing, and fuel injection pulse width values.

17. The method of claim 14, further comprising:
operating the internal combustion engine in an exhaust re-compression mode of operation during a first portion of said low engine load portion of said homogeneous charge compression ignition mode;

providing feed-forward command values, via the plurality of lookup tables, to the internal combustion engine for at least one of fuel injection pulse width, fuel injection timing, spark timing, spark dwell, and variable valve actuation;

controlling, via the feed-back control, the location of peak pressure within the combustion chamber using variable valve actuation values and controlling, via feed-back control, the air/fuel ratio using at least one of variable valve actuation and throttle position values;

operating the internal combustion engine in an exhaust re-breathing mode of operation during a second portion of said low engine load portion of said homogeneous charge compression ignition mode;

providing feed-forward command values, via the plurality of lookup tables, to the internal combustion engine for at least one of fuel injection pulse width, fuel injection timing, spark timing, spark dwell, and variable valve actuation; and controlling, via the feed-back control, the location of peak pressure within the combustion chamber using variable valve actuation values and controlling, via feed-back control, the air/fuel ratio using at least one of variable valve actuation and throttle position values.

18. The method of claim 17, further comprising:
transitioning between said first portion and said second portion of said low engine load portion of said homogeneous charge compression ignition mode by controlling, via the feed-back control, the location of peak pressure within the combustion chamber using variable valve actuation values and controlling, via feed-back control, the air/fuel ratio using at least one of variable valve actuation and throttle position values.

19. The method of claim 13, wherein the feed-forward control includes rate limiters to provide dynamic compensation.

20. The method of claim 13, wherein the feed-back control is operable in a multiple input multiple output mode of operation.

21. A method of operating a four-stroke direct injection internal combustion engine having a combustion chamber, an intake valve having an intake valve profile defining a lift, timing, and duration, and an exhaust valve having an exhaust valve profile defining a lift, timing, and duration, said method comprising:

operating the internal combustion engine in a homogeneous charge compression ignition mode when engine load is at or below a first predetermined value;

operating the internal combustion engine in a spark ignited non-throttled load control mode when engine load is above said first predetermined value and below a second predetermined value;

operating the internal combustion engine in a spark ignited throttled mode when engine load is at or above said second predetermined value;

operating the internal combustion engine with a generally lean of stoichiometric air/fuel ratio for a low engine load portion of said homogeneous charge compression ignition mode; and subsequently, operating the internal combustion engine with a generally stoichiometric air/fuel ratio for a high engine load portion of said homogeneous charge compression ignition mode.

* * * * *